United States Patent Office 3,349,899
Patented Oct. 31, 1967

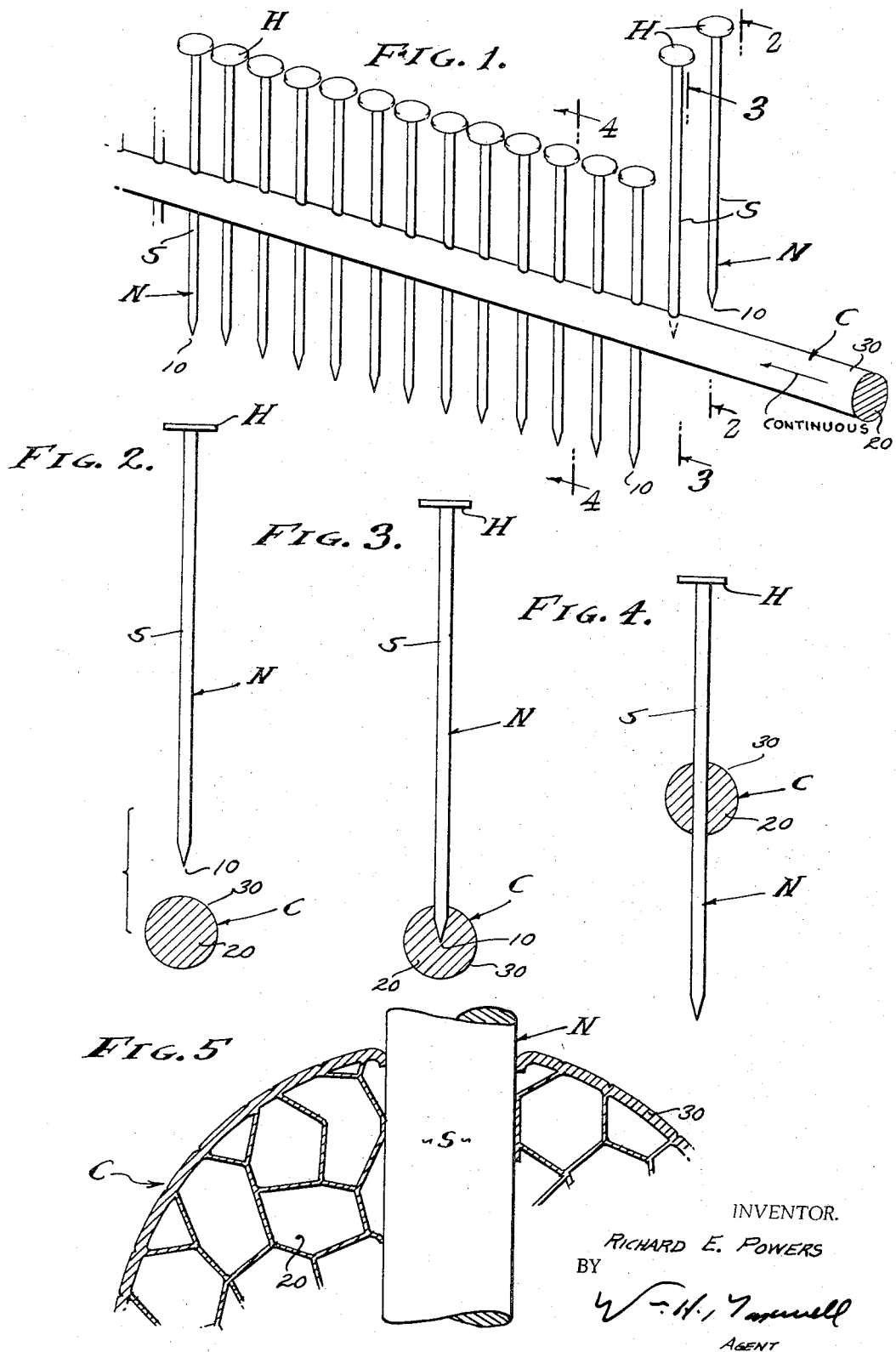

3,349,899
BELTED FASTENERS
Richard E. Powers, San Marino, Calif., assignor to Powers Wire Products Co., Inc., El Monte, Calif., a corporation of California
Filed Feb. 7, 1966, Ser. No. 525,597
10 Claims. (Cl. 206—56)

This invention relates to fasteners that are to be driven successively by means of power operated tools and is particularly concerned with the interconnection of fasteners in regimented order, whereby like fasteners are uniformly supplied to the workings of a driving tool in successive order.

Fasteners are supplied to power operated tools in many forms and configurations, most of which require special adaptations in the tool, and/or in the configuration in which the fastener is supplied. In most instances the various adaptations that are resorted to are restrictive insofar as the utility of the fastener is concerned and the fastener per se is usually of some special sort adapted to be arranged in a magazine supply for power tool application. As an alternative to special fastener configuration and construction, carriers of various sorts have been employed for the regimented support of fasteners in a power tool magazine. Such carriers have been in the form of paper belts, cards, cardboard sticks and the like, and almost all of which are expendable after withdrawal of the fasteners therefrom. The carriers are not widely used because of their extra cost and because of problems incurred thereby relating to loading and to disposal of debris resulting from their use. In the first place, such carriers must be specially fabricated and then loaded with fasteners accordingly. In the second place, such carriers must be substantial and as a consequence present considerable bulk to be disposed of. It is true that fastener carriers lend themselves to versatility in the reception of almost all varieties of fasteners, each with special capabilities. However, the expense and bulk of such carriers is disadvantageous and can be said to outweigh the advantages, and therefore sticks of fasteners interconnected as by adhesives or the like are most often used in preference or resort to carriers. In view of the foregoing, it is an object of this invention to provide a fastener carrier that maintains the advantages above referred to and which avoids said disadvantages.

An object of this invention is to provide an improved fastener carrier for the pre-positioning of a multiplicity of fasteners in aligned regimentation for successive application as by means of being acted upon in a power operated driving tool. With this invention the style and/or type of fastener can vary to extremes, it being a characteristic feature that each fastener involves an elongate shank, it being understood that it is primarily the variation in head configuration which alters the style and/or type of fastener.

Another object of this invention is the provision of a durable and expendable fastener carrier, formed of a material which is mechanically weak in its generally accepted condition but in mechanically durable form in accordance with this invention, while utilizing to advantage the weak and non-bulky character of said material. In practicing the invention, a cellular foamed plastic material is employed as the fastener carrier, and the carrier and multiplicity of fasteners forms a belt of fasteners.

It is another object of this invention to provide a simple inexpensive and expendable carrier that frictionally holds fasteners in position upon insertion therethrough, as by piercing of the carrier with said fasteners that are then positioned thereby. With the present invention, fasteners of whatever type or style that may be are inherently adapted to pierce the carrier for frictionally positioned engagement, the only requirement of the fastener being that it have an elongated shank.

It is still another object of this invention to provide a carrier as above referred to and which is destructable with facility. The carrier as hereinafter disclosed is sufficiently durable for the normal handling and arrangement of fasteners within the magazine of a driving tool, and yet it is readily disposed of upon mechanical actuation, of said driving tool and disintegrated and expended. It is the frangible characteristic of the material and its form which enters into the practical combination of the multiplicity of fasteners interconnected thereby as hereinafter disclosed.

The various objects and features of this invention will be fully understood from the following detailed description of the typical preferred form and application thereof, throughout which description reference is made to the accompanying drawings, in which:

FIG. 1 is a perspective view showing the completed belt of fasteners and illustrating the manner of assembly.

FIGS. 2, 3 and 4 are enlarged sectional views taken as indicated by lines 2—2, 3—3 and 4—4 of FIG. 1.

FIG. 5 is an enlarged detailed fragmentary view of a portion of the structure appearing in FIG. 4.

The fastener with which the present invention is concerned is a driveable fastener, and although screws and the like are to be included it is primarily nails and the like that are to be regimented. However, this invention is not to be limited to nails as such and the belted fasteners are to be any elongated pin-shaped fasteners or like objects, preferably pointed at one end and headed at the other end. The invention will be described as it relates to a nail N and wherein said nail has a substantial head H at the driving end of a shank S. The shank S is usually round in cross section as it is shown and the head is usually disc-shaped and in a plane normal to the axis of the shank. The terminal end 10 of the shank is usually sharpened as shown. This nail N, as it is shown and generally described, is a "common nail" in which case the head H is substantially more than twice the diameter of the shank S. It is significant that the configuration of whatever nail be employed remain standard without any modification whatsoever.

In FIG. 1 of the drawings I have shown the manner of assembly of the belted fasteners and wherein the multiplicity of like and/or identical fasteners N is combined with a carrier C. The assembly or belt of fasteners is shown in a straight formation although in actual practice the carrier C is pliant and thereby permits great flexibility of the belt thus formed, it being understood that the carrier C can be made of any stiffness or rigidity desired as circumstances require. The belted fastener combination involves the multiplicity of fasteners and the carrier C in the form of a single body of specially formed material.

Generally, the belted fasteners is an elongated assembly wherein the nails N are regimented to a continuous series thereof uniformly spaced and positioned with respect to the carrier C. As is clearly shown, the carrier C is an elongated element and it is continuous as indicated. There need be no special provision for the nail N in the carrier C and the section of carrier that is shown does illustrate the simple uncomplicated nature of the carrier prior to the insertion therethrough of the nails N. The said nails N are related to the carrier C as shown, either manually or as by automatic means (not shown), and the nails are moved into belted position so as to pierce the carrier, to make their own way therethrough, and to establish frictional engagement therein. The said frictional engagement is internal within the body which forms the carrier C. Any like or identical fasteners N are employed as shown in the drawings, then it is preferred that the adjacently related fasteners be equally spaced and disposed on parallel axes with ample clearance between the adjacent heads H thereof. Further, it is preferred that the fasteners N be of identical length and that the heads thereof be disposed in a common longitudinally extending plane parallel with the disposition of the carrier C.

In accordance with the invention I provide the carrier C, the details of which are best illustrated in FIG. 5 of the drawings. The carrier C is a continuous longitudinally extended lightweight body of material comprising a low density core 20 and a high density skin 30. It is preferred that the core 20 and skin 30 be formed of a rather flexible and/or resilient material of non-metallic nature, there being a particularly adaptable plastic material that is especially suitable therefor. Specifically, an extruded unilce cellular expanded polyethylene substance is used to provide the material of the carrier C, thereby providing a pliant and lightweight puncturable body therefor. Referring to the core 20, said core is solid foamed core made up of many small non-connected cells. Referring to the skin 30, said skin is an uninterrupted shell that encases the core 20.

A peculiarity of expanded polyethylene is the formation of a surface skin thereon due to the application of heat and by the cooking thereof during the process of foaming and curing the same. Ordinarily, said formation of skin is a detriment and it is trimmed away because of its non-uniformity and incompatible appearance and texture when compared with the foamed interior or core 20. However, in practicing this invention the dissimilarity of skin and core is of great and advantageous consequence because of the substantial increase in strength afforded by said skin encased core. Firstly, the skin 30 which is necessarily form, as when the plastic material is simultaneously extruded and cooked, is inherently tough and most often thicker when compared with the inter-walls of the cells in the core 20. Secondly, the skin 30 is a continuous encompressing shall of uninterrupted monocoque structure. As a result, the carrier C can be proportioned and initially formed for the support of nails N, and it is preferably round in cross section.

Referring now to FIG. 5 of the drawings, the reinforcement afforded by the toughened and/or thickened skin 30 is clearly illustrated. Further, the assembly steps which are consecutively shown by FIGS. 2, 3 and 4 (taken from FIG. 1) clearly illustrate the structural relationship of the core 20, skin 30 and rather smooth but not perfect surface of the nail shank S. It will be apparent that the piercing of the carrier C by the nail shank S displaces the core 20 and skin 30 and to the end that a constriction thereof onto the shank S is established. Further, the skin 30, and also the inter-walls of the cells, will tend to fold and/or turn with the movement of the shank S, thereby affording increased frictional engagement which tends to lock the fasteners in the position of placement disposed in a common plane extending transversely and diametrically through the carrier C.

From the foregoing the simple practicality of the instant carrier for the belting of fasteners will be apparent. It is a simple matter to belt lengths or continuous strips of fasteners N by projecting them in regimented order through the skin 30 and core 20 of the carrier C. The stiffness of the carrier can be readily controlled as required and all without adversely affecting the destructability thereof, said destruction taking place incrementally with and at the driving and/or servering of the fastener from the belt thereof. In practice, the severing forces of each driving engagement by a power driven tool are more than adequate to destroy the incremental portion of the carrier C associated with the endmost fastener that is acted upon by the power tool to be driven thereby.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. A belt supply of fasteners for dispensing from a power tool and comprising, a multiplicity of like fasteners and wherein each fastener comprises an axially disposed shank with a piercing end and with an enlarged head at the end opposite said piercing end, and an expendable carrier receiving and holding the fasteners and formed of an elongated low density body of frangible material for subsequent destruction in the power tool, said fastener shanks piercing said body of material at successively spaced intervals and frictionally engaged therein and positioned in regimented order.

2. The belt of fasteners as set forth in claim 1 and wherein the multiplicity of fasteners pierce the carrier body in a common plane extending transversely through said body.

3. The belt of fasteners as set forth in claim 1 and wherein the carrier body is round in cross sectional configuration and the multiplicity of fasteners pierce the carrier body in a common plane extending diametrically therethrough.

4. The belt of fasteners as set forth in claim 1 and wherein the carrier body includes a low density core encased in a high density skin, both of which are pierced by the fastener shanks.

5. The belt of fasteners as set forth in claim 1 and wherein the carrier body of material is foamed plastic pierced by the fastener shanks.

6. The belt of fasteners as set forth in claim 1 and wherein the carrier body of material is foamed plastic encased in a skin and both of which are pierced by the fastener shanks.

7. The belt of fasteners as set forth in claim 1 and wherein the carrier body of material is expanded into a low density multicellular form pierced by the fastener shanks.

8. The belt of fasteners as set forth in claim 1 and wherein the carrier body of material has an expanded low density core of multicellular form encased in a skin of high density and both of which are pierced by the fastener shanks.

9. The belt of fasteners as set forth in claim 1 and wherein the carrier body of material is expanded polyethylene and of a low density pierced by the fastener shanks.

10. The belt of fasteners as set forth in claim 1 and wherein the carrier body of material is expanded polyethylene having a core of low density multicellular form encased in a skin of high density and both of which are pierced by the fastener shanks.

References Cited

UNITED STATES PATENTS

| | | | |
|---|---|---|---|
| 1,378,550 | 2/1921 | Miller | 206—56 |
| 1,436,160 | 11/1922 | Foedisch et al. | 206—66 |
| 3,032,769 | 5/1962 | Palmer | 59—77 XR |
| 3,097,360 | 7/1963 | Carlson et al. | 206—56 |
| 3,221,872 | 12/1965 | Wood | 206—46 |

FOREIGN PATENTS 789,371   1/1958   Great Britain.

THERON E. CONDON, *Primary Examiner.*

LOUIS G. MANCENE, *Examiner.*

J. M. CASKIE, *Assistant Examiner.*